United States Patent
Nozaki et al.

(10) Patent No.: US 10,174,686 B2
(45) Date of Patent: Jan. 8, 2019

(54) CONTROL DEVICE AND CONTROL METHOD FOR INTERNAL COMBUSTION ENGINE

(71) Applicant: TOYOTA JIDOSHA KABUSHIKI KAISHA, Toyota-shi (JP)

(72) Inventors: Tomohiro Nozaki, Nagoya (JP); Masaaki Yamaguchi, Okazaki (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 199 days.

(21) Appl. No.: 15/095,316

(22) Filed: Apr. 11, 2016

(65) Prior Publication Data

US 2016/0298503 A1    Oct. 13, 2016

(30) Foreign Application Priority Data

Apr. 13, 2015  (JP) .................................. 2015-081797
Dec. 16, 2015  (JP) .................................. 2015-245262

(51) Int. Cl.

| F01L 1/34 | (2006.01) |
| F02D 41/00 | (2006.01) |
| F01L 1/344 | (2006.01) |
| F02D 13/02 | (2006.01) |
| F02D 41/06 | (2006.01) |

(52) U.S. Cl.
CPC ........ F02D 41/0002 (2013.01); F01L 1/3442 (2013.01); F02D 13/0219 (2013.01); F02D 41/062 (2013.01); F02D 2041/001 (2013.01); Y02T 10/18 (2013.01); Y02T 10/42 (2013.01)

(58) Field of Classification Search
CPC ..... F01L 1/344; F01L 1/3442; F02D 13/0219; F02D 41/0002; F02D 2014/001
USPC ........................................... 123/90.15, 90.17
See application file for complete search history.

(56) References Cited

U.S. PATENT DOCUMENTS 8,156,906 B2 *  4/2012  Takenaka ................ F01L 1/022
                                                   123/90.17
2010/0154740 A1  6/2010  Mitsuishi
2010/0222986 A1  9/2010  Ishii et al.
2010/0300386 A1  12/2010  Asami et al.

FOREIGN PATENT DOCUMENTS

JP    2007-32515    2/2007
JP    2010-174733   8/2010

OTHER PUBLICATIONS

German Office Action dated Sep. 24, 2018 for German Application No. DE102016106437.8.

* cited by examiner

*Primary Examiner* — Ching Chang
(74) *Attorney, Agent, or Firm* — Oblon, McClelland, Maier & Neustadt, L.L.P.

(57) ABSTRACT

An ECU calculates a target phase angle of an intake valve, a target phase angle of an exhaust valve, and a target overlap period based on a rotational speed and a load factor of an engine. The ECU is configured to, in the case where valve timings of the intake valve and the exhaust valve are advanced, set the target phase angle of an intake valve and the target phase angle of the exhaust valve as the target phase angles of the exhaust valve and the intake valve when a minus overlap takes place.

10 Claims, 8 Drawing Sheets

RELATED ART

CONTROL DEVICE AND CONTROL METHOD FOR INTERNAL COMBUSTION ENGINE

INCORPORATION BY REFERENCE

The disclosure of Japanese Patent Application Nos. 2015-081797 and 2015-245262 filed on Apr. 13, 2015 and Dec. 16, 2015 including the specification, drawings and abstract is incorporated herein by reference in its entirety.

BACKGROUND

1. Technical Field

The disclosure relates to a control device and a control method for an internal combustion engine.

2. Description of Related Art

Japanese Patent Application Publication No. 2007-32515 (JP 2007-32515 A) discloses a control device for an internal combustion engine that includes an intake variable valve timing (VVT) mechanism and an exhaust VVT mechanism.

In such an internal combustion engine, rotation phases of an intake camshaft and an exhaust camshaft with respect to a crankshaft are changed using the intake VVT mechanism and the exhaust VVT mechanism. Thus, valve timings of an intake valve and an exhaust valve are changed. In addition, in accordance with the operation state of the internal combustion engine, an overlap period of the intake valve and the exhaust valve is controlled. Thus, it is possible to achieve an improvement in the output of the internal combustion engine, an improvement in fuel efficiency, and a reduction in exhaust emission.

In the control device for the internal combustion engine of JP 2007-32515 A, when an operation is shifted from an acceleration operation to a steady operation, the valve timing of the exhaust valve is advanced by a predetermined amount and the valve timing of the intake valve is advanced by an amount larger than the predetermined amount from a state in which the overlap period of the exhaust valve and the intake valve is zero. According to this, the exhaust valve opens in a state in which an in-cylinder pressure is high, and hence it is possible to increase an internal exhaust gas recirculation (EGR) amount.

SUMMARY

In the internal combustion engine that includes the intake variable valve timing mechanism and the exhaust variable valve timing mechanism, in an initial state (before the operation is started), the valve timing of the exhaust valve is set to the most advanced position, and the valve timing of the intake valve is set to the most retarded position. Accordingly, in the initial state, the overlap period has the minimum negative value, i.e., a minus overlap period is maximized. The minus overlap denotes that a period in which both of the intake valve and the exhaust valve are in a closed state is present in a period from closing of the exhaust valve to opening of the intake value.

In the control device for the internal combustion engine described above, target phase angles of the intake valve and the exhaust valve and a target overlap period are calculated from a base map in accordance with the operation state of the internal combustion engine. In addition, the intake variable valve timing mechanism and the exhaust variable valve timing mechanism are controlled such that a deviation between the calculated target phase angle and an actual phase angle is eliminated.

The target phase angle of the exhaust valve is a target retard amount from the initial position (most advanced position) of the exhaust value. The target phase angle of the intake valve is a target advance amount from the initial position (most retarded position) of the intake valve. Each target value calculated from the base map (hereinafter also referred to as a "base map value") is a value that serves as an optimum fuel efficiency point corresponding to the operation state.

Figure 8:
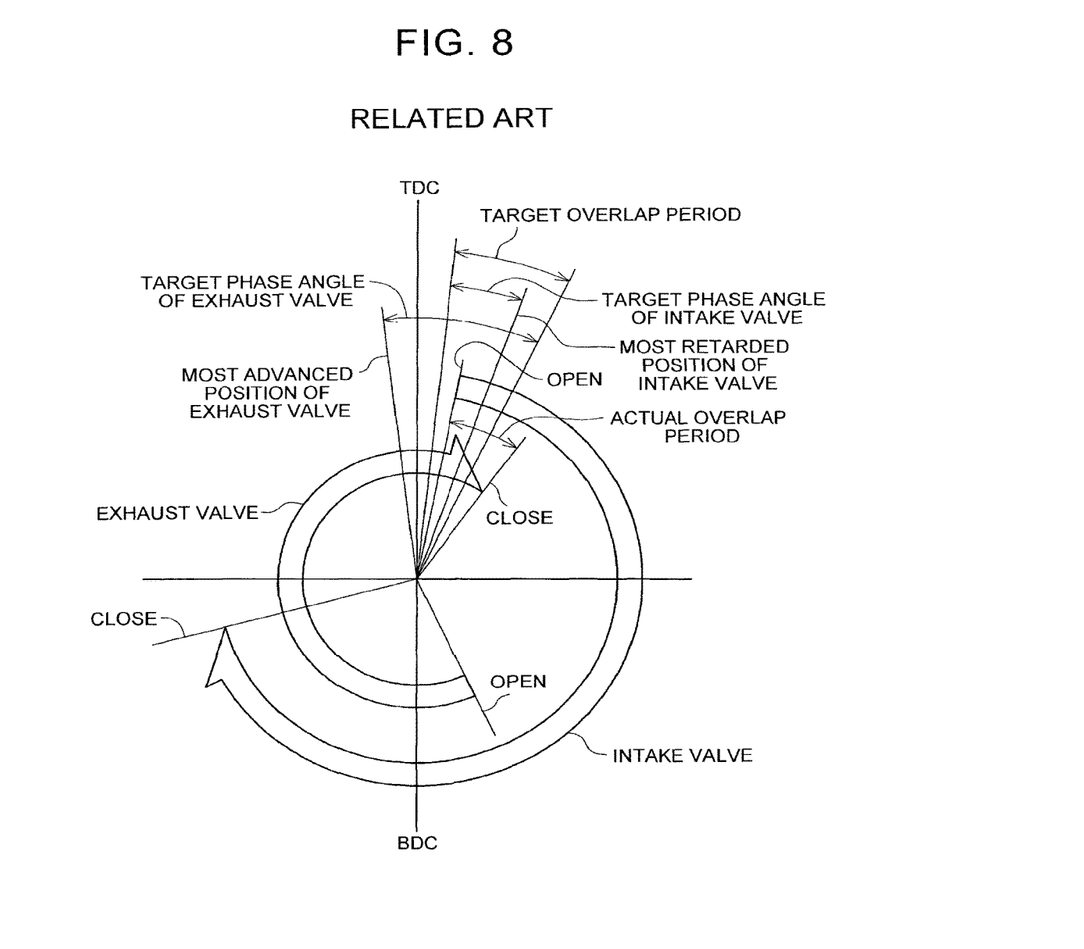
FIG. 8 is a view showing an example of the opening/closing timing in the case where the valve timings of the intake valve and the exhaust valve are advanced in the related art.

FIG. 8 shows a case where the valve timing is controlled based on the target phase angle that serves as the optimum fuel efficiency point. For example, when the valve timings of the intake valve and the exhaust valve are advanced, as shown in FIG. 8, there are cases where the actual overlap period transiently exceeds the target overlap period due to a following delay of the exhaust valve having an operation direction on a side that decreases the overlap.

To cope with this, when the valve timings of the intake valve and the exhaust valve are advanced, it is conceivable to set the target phase angle of the intake valve having the operation direction on a side that increases the overlap to a value smaller than the base map value. With this, it is conceivable to prevent the actual overlap period from exceeding the target overlap period. However, when the target phase angle is set to be smaller than the base map value, it may take time for the valve timing of the intake valve to converge to the optimum fuel efficiency point.

When the same control is applied to the case where the valve timings of the intake valve and the exhaust valve are retarded, there may be cases where it takes time for the valve timing to converge to the optimum fuel efficiency point.

The disclosure provides the control device and the control method for the internal combustion engine capable of facilitating convergence of the valve timing to the base map value while preventing the actual overlap period from exceeding the target overlap period.

An example aspect of the disclosure provides a control device for an internal combustion engine, the internal combustion engine includes an intake valve, an exhaust valve, an intake variable valve timing mechanism, and an exhaust variable valve timing mechanism. The intake variable valve timing mechanism is configured to change a first valve timing. The first valve timing is a valve timing of the intake valve. The exhaust variable valve timing mechanism is configured to change a second valve timing. The second valve timing is a valve timing of the exhaust valve. The control device includes an electronic control unit configured to: calculate a first target phase angle of the intake valve, a second target phase angle of the exhaust valve, and a target overlap period, based on a rotational speed and a load factor of the internal combustion engine; calculate a third target phase angle, when the first valve timing and the second valve timing are advanced, based on the target overlap period and a second actual phase angle, the second actual phase angle being an actual phase angle of the exhaust valve, and the third target phase angle being a target phase angle of the intake valve; set the second target phase angle as the target phase angle of the exhaust valve and set the third target phase angle as the target phase angle of the intake valve, when the first valve timing and the second valve timing are advanced; and set the second target phase angle as the target phase angle of the exhaust valve and set the first target phase angle as the target phase angle of the intake valve, when the first valve timing and the second valve timing are advanced such that a minus overlap takes place, the minus overlap being a state such that both of the intake valve and the exhaust valve are in a closed state in a period from closing of the exhaust valve to opening of the intake valve.

The second target phase angle of the exhaust valve is a target retard amount from an initial position (most advanced position) of the exhaust valve. The first target phase angle of the intake valve is a target advance amount from an initial position (most retarded position) of the intake valve. The actual phase angle of the exhaust valve is an actual phase angle (the retard amount from the initial position) of the exhaust valve. The overlap period is an angle range (period) in which both of the intake valve and the exhaust valve are in an open state. The target overlap period is a target value of the overlap period. When the overlap period has a positive value, the period in which both of the intake valve and the exhaust valve are in the open state is present. On the other hand, when the overlap period has a negative value, the period in which both of the intake valve and the exhaust valve are in the closed state is present.

With this configuration, it is possible to calculate the target phase angle (base map value) of the intake valve from a base map in accordance with an operation state, and calculate the target phase angle of the intake valve that is not more than the base map value. At the time of the overlap in the case where the valve timings of the intake valve and the exhaust valve are advanced, by setting the calculated value as the target phase angle of the intake valve, it is possible to prevent the actual overlap period from exceeding the target overlap period. At the time of the minus overlap in the case where the valve timings of the intake valve and the exhaust valve are advanced, by setting the calculated value as the target phase angle of the intake valve, it is possible to facilitate convergence of the valve timing of the intake valve to the base map value. Consequently, in the case where the valve timings of the intake valve and the exhaust valve are advanced, it is possible to facilitate the convergence of the valve timing of the intake valve to the base map value while preventing the actual overlap period from exceeding the target overlap period.

In the control device, the electronic control unit may be configured to determine whether or not the first valve timing and the second valve timing are set such that the minus overlap takes place based on the first target phase angle and the second actual phase angle of the exhaust valve in a case where the first valve timing and the second valve timing are advanced.

With this configuration, it is possible to easily determine whether or not the minus overlap is established.

In the control device, the electronic control unit may be configured to calculate a fourth target phase angle based on the target overlap period and a first actual phase angle, when the first valve timing and the second valve timing are retarded, the fourth target phase angle is a target phase angle of the exhaust valve, and the first actual phase angle is an actual phase angle of the intake valve. The electronic control unit may be configured to set the fourth target phase angle as the target phase angle of the exhaust valve and set the first target phase angle as the target phase angle of the intake valve, when the first valve timing and the second valve timing are retarded. The electronic control unit may be configured to set the second target phase angle as the target phase angle of the exhaust valve and set the first target phase angle as the target phase angle of the intake valve, when the first valve timing and the second valve timing are retarded such that the minus overlap takes place. The actual phase angle of the intake valve is an actual advance amount from the initial position (phase angle) of the intake valve.

With this configuration, in the case where the valve timings of the intake valve and the exhaust valve are retarded, it is possible to facilitate the convergence of the valve timing of the exhaust valve to the base map value while preventing the actual overlap period from exceeding the target overlap period.

In the control device, the electronic control unit may be configured to determine whether or not the minus overlap takes place based on the second target phase angle and the first actual phase angle of the intake valve when the first valve timing and the second valve timing are retarded.

With this configuration, it is possible to easily determine whether or not the minus overlap is established.

In the control device, the electronic control unit may be configured to calculate a fifth target phase angle of the intake valve based on the target overlap period, the second actual phase angle of the exhaust valve, and a valve variation angle when the first valve timing and the second valve timing are advanced. The valve variation angle is an angle range of the intake valve and the exhaust valve that fluctuate due to a cam reaction force that periodically increases or decreases with opening/closing operations of the intake valve and the exhaust valve, and is, e.g., a preset value.

With this configuration, in the case where the valve timings of the intake valve and the exhaust valve are advanced, even when the intake valve and the exhaust valve fluctuate due to the cam reaction force, it is possible to prevent the actual overlap period from exceeding the target overlap period.

In the control device, the electronic control unit may be configured to determine whether or not the minus overlap takes place based on the first target phase angle, the second actual phase angle of the exhaust valve, and the valve variation angle when the first valve timing and the second valve timing are advanced.

With this configuration, it is possible to determine whether or not the minus overlap is established in consideration of the valve variation angle.

In the control device, the electronic control unit may be configured to calculate a sixth target phase angle of the exhaust valve based on the target overlap period, a first actual phase angle of the intake valve, and the valve variation angle when the first valve timing and the second valve timing are retarded. The electronic control unit may be configured to set the sixth target phase angle as the target phase angle of the exhaust valve and set the first target phase angle as the target phase angle of the intake valve when the first valve timing and the second valve timing are retarded. The electronic control unit may be configured to set the first target phase angle as the target phase angle of the exhaust valve and set the second target phase angle as the target phase angle of the intake valve when the first valve timing and the second valve timing are retarded such that the minus overlap takes place.

With this configuration, in the case where the valve timings of the intake valve and the exhaust valve are retarded, even when the intake valve and the exhaust valve fluctuate due to the cam reaction force, it is possible to prevent the actual overlap period from exceeding the target overlap period.

In the control device, the electronic control unit may be configured to determine whether or not the minus overlap takes place based on the second target phase angle, the first actual phase angle of the intake valve, and the valve variation angle when the first valve timing and the second valve timing are retarded.

With this configuration, it is possible to determine whether or not the minus overlap is established in consideration of the valve variation angle.

Another example aspect of the disclosure provides a control device for an internal combustion engine, the internal combustion engine includes an intake valve, an exhaust valve, an intake variable valve timing mechanism, and an exhaust variable valve timing mechanism. The intake variable valve timing mechanism is configured to change a first valve timing. The first valve timing is a valve timing of the intake valve. The exhaust variable valve timing mechanism is configured to change a second valve timing. The second valve timing is a valve timing of the exhaust valve. The control device includes an electronic control unit configured to: calculate a first target phase angle of the intake valve, a second target phase angle of the exhaust valve, and a target overlap period based on a rotational speed and a load factor of the internal combustion engine; calculate a fourth target phase angle based on the target overlap period and a first actual phase angle when the first valve timing and the second valve timing are retarded, the fourth target phase angle being a target phase angle of the exhaust valve, the first actual phase angle being an actual phase angle of the intake valve; set the fourth target phase angle as the target phase angle of the exhaust valve and set the first target phase angle as the target phase angle of the intake valve when the first valve timing and the second valve timing are retarded; and set the second target phase angle as the target phase angle of the exhaust valve and set the first target phase angle as the target phase angle of the intake valve, when the first valve timing and the second valve timing are retarded such that a minus overlap takes place. The minus overlap is a state such that both of the intake valve and the exhaust valve are in a closed state in a period from closing of the exhaust valve to opening of the intake valve.

Another example aspect of the disclosure provides a control method for an internal combustion engine, the internal combustion engine including an intake valve, an exhaust valve, an intake variable valve timing mechanism, and an exhaust variable valve timing mechanism. The intake variable valve timing mechanism is configured to change a first valve timing, the first valve timing being a valve timing of the intake valve. The exhaust variable valve timing mechanism is configured to change a second valve timing, the second valve timing being a valve timing of the exhaust valve. The control method includes: calculating a first target phase angle of the intake valve, a second target phase angle of the exhaust valve, and a target overlap period, based on a rotational speed and a load factor of the internal combustion engine; calculating a third target phase angle, when the first valve timing and the second valve timing are advanced, based on the target overlap period and a second actual phase angle, the second actual phase angle being an actual phase angle of the exhaust valve and the third target phase angle being a target phase angle of the intake valve; setting the second target phase angle as the target phase angle of the exhaust valve and setting the third target phase angle as the target phase angle of the intake valve, when the first valve timing and the second valve timing are advanced; and setting the second target phase angle as the target phase angle of the exhaust valve and setting the first target phase angle as the target phase angle of the intake valve, when the first valve timing and the second valve timing are advanced such that a minus overlap takes place. The minus overlap is a state such that both of the intake valve and the exhaust valve are in a closed state in a period from closing of the exhaust valve to opening of the intake valve.

According to the above configuration, it is possible to facilitate the convergence of the valve timing to the base map value while preventing the actual overlap period from exceeding the target overlap period.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Hereinbelow, embodiments will be described based on the drawings. The following embodiments are implemented by an ECU 400 that controls an engine (internal combustion engine) 1 mounted on a vehicle.

Figure 1:
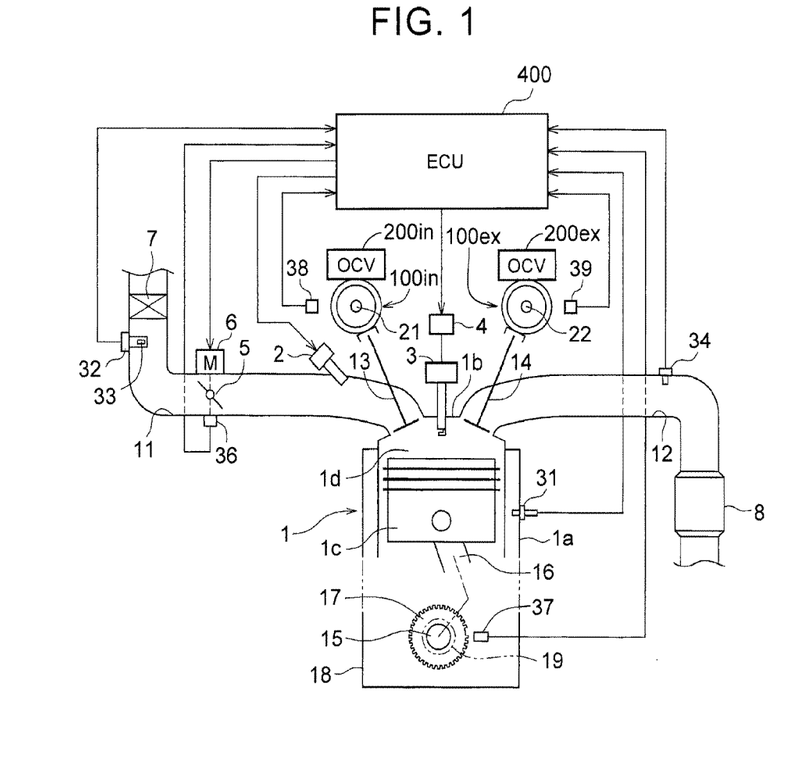
FIG. 1 is a schematic configuration diagram showing an example of an engine controlled by an electronic control unit (ECU) according to a first embodiment.

First, a first embodiment will be described. As shown in FIG. 1, the engine 1 is, e.g., a port-injection type four-cylinder gasoline engine, and a piston 1c is provided in a cylinder block 1a. The piston 1c is coupled to a crankshaft 15 via a connecting rod 16. FIG. 1 shows only the configuration of one cylinder of the engine 1.

A cylinder head 1b is mounted to the upper end of the cylinder block 1a, and a combustion chamber 1d is formed between the cylinder head 1b and the piston 1c. An ignition plug 3 is disposed in the combustion chamber 1d of the engine 1. The ignition timing of the ignition plug 3 is adjusted by an igniter 4.

An oil pan 18 is provided in the lower portion of the cylinder block 1a of the engine 1. Lubricant stored in the oil pan 18 is pumped by an oil pump 19 via an oil strainer 20 (see FIG. 2) during the operation of the engine 1, and is used to lubricate and cool the individual portions in the engine 1. In addition, the lubricant is also used as hydraulic oil for an intake VVT mechanism 100in and an exhaust VVT mechanism 100ex described later. The oil pump 19 is, e.g., a mechanical pump that is driven by rotation of the crankshaft 15 of the engine 1.

A signal rotor 17 is mounted to the crankshaft 15, and a crank position sensor 37 is disposed in the vicinity of the signal rotor 17. The crank position sensor 37 is provided in order to detect the rotational position of the crankshaft 15. In addition, a coolant temperature sensor 31 that detects the temperature of coolant is disposed in the cylinder block 1a of the engine 1.

An intake passage 11 and an exhaust passage 12 are connected to the combustion chamber 1d of the engine 1. In the intake passage 11, an air cleaner 7, an air flow meter 32 that measures an intake air amount, an intake air temperature sensor 33 that measures an intake air temperature, an electronically controlled throttle valve 5 for adjusting the intake air amount, and the like are disposed. The throttle valve 5 is driven by a throttle motor 6. An opening of the throttle valve 5 is detected by a throttle opening sensor 36. In the exhaust passage 12, an $O_2$ sensor 34 that detects an oxygen concentration in exhaust gas and a catalytic converter (three-way catalyst) 8 are disposed.

An intake valve 13 is provided between the intake passage 11 and the combustion chamber 1d, and an exhaust valve 14 is provided between the exhaust passage 12 and the combustion chamber 1d. An opening/closing drive of the intake valve 13 and the exhaust valve 14 is performed with the rotation of each of an intake camshaft 21 and an exhaust camshaft 22 to which the rotation of the crankshaft 15 is transmitted via a timing belt and the like. The intake VVT mechanism 100in that varies the valve timing of the intake valve 13 is provided at an end portion of the intake camshaft 21, and the exhaust VVT mechanism 100ex that varies the valve timing of the exhaust valve 14 is provided at an end portion of the exhaust camshaft 22. The detail of each of the intake VVT mechanism 100in and the exhaust VVT mechanism 100ex will be described later.

An intake cam position sensor 38 is disposed in the vicinities of the intake camshaft 21. An exhaust cam position sensor 39 is disposed in the vicinities of the exhaust camshaft 22. The intake cam position sensor 38 is provided in order to detect the rotational position of the intake camshaft 21. The exhaust cam position sensor 39 is provided in order to detect the rotational position of the exhaust camshaft 22.

An injector (fuel injection valve) 2 for fuel injection is disposed in the intake passage 11. Fuel injected from the injector 2 is mixed with intake air to become an air-fuel mixture, and the air-fuel mixture is introduced into the combustion chamber 1d.

The air-fuel mixture introduced into the combustion chamber 1d is ignited by the ignition plug 3, and is combusted and exploded. The piston 1c reciprocates with the combustion and explosion of the air-fuel mixture, and the crankshaft 15 thereby rotates.

Figure 2:
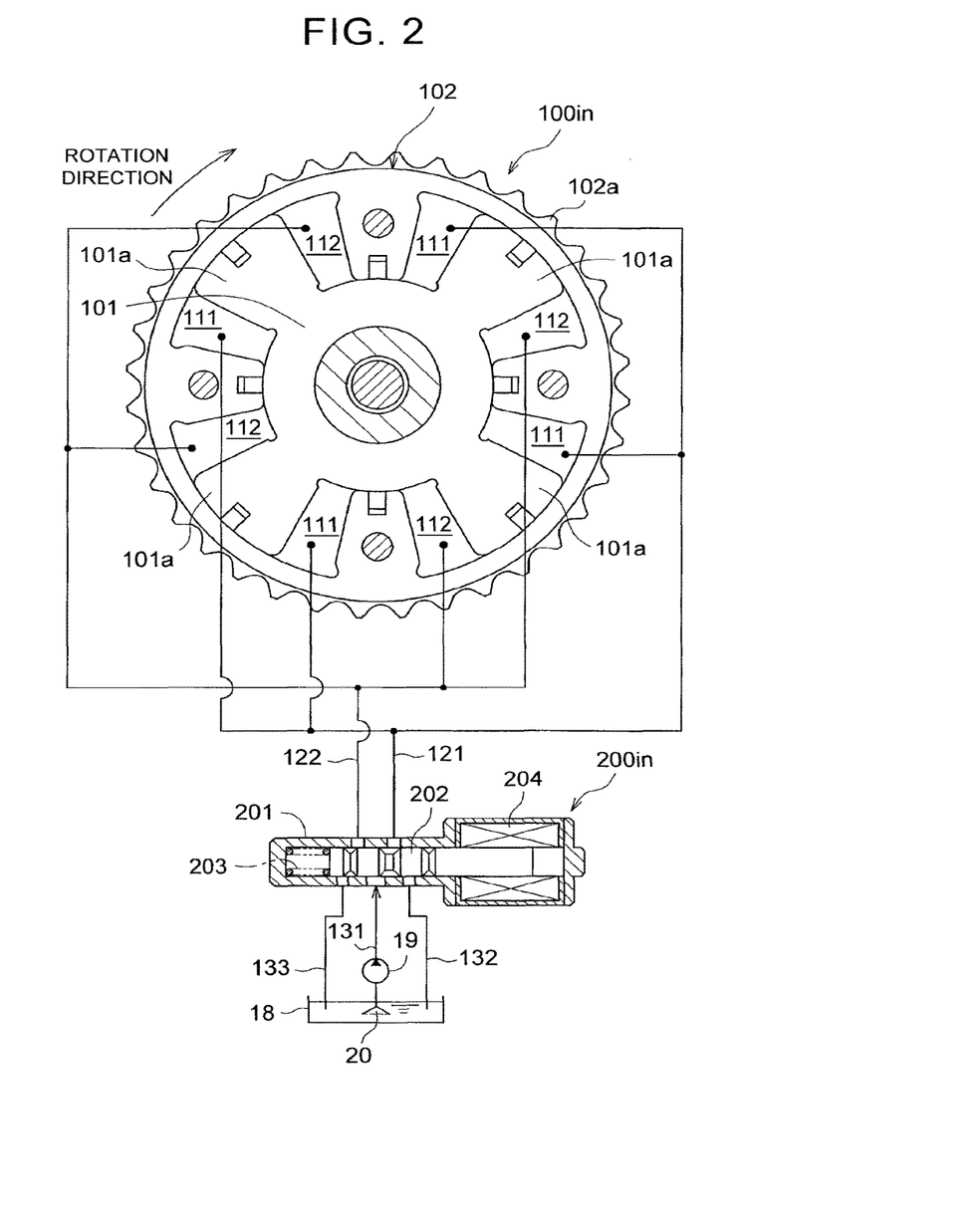
FIG. 2 is a view for explaining an intake VVT mechanism in FIG. 1 and an intake oil control valve (OCV) that controls the intake VVT.

Next, the intake VVT mechanism 100in and an intake oil control valve (OCV) 200in that controls the intake VVT mechanism 100in will be described. Note that the exhaust VVT mechanism 100ex and an exhaust OCV 200ex are configured substantially similarly to the intake VVT mechanism 100in and the intake OCV 200in, and hence the description thereof will be omitted.

As shown in FIG. 2, the intake VVT mechanism 100in includes a vane rotor 101 and a housing 102 that houses the vane rotor 101. The vane rotor 101 is coupled to the intake camshaft 21 (see FIG. 1). A timing pulley 102a is provided in the housing 102, and the timing pulley 102a is coupled to the crankshaft 15 (see FIG. 1) via a timing belt that is not shown. In the housing 102, advance hydraulic chambers 111 and retard hydraulic chambers 112 that are partitioned by vanes 101a of the vane rotor 101 are formed.

In the intake VVT mechanism 100in, the vane rotor 101 rotates with respect to the housing 102 in accordance with hydraulic pressure in the advance hydraulic chamber 111 and hydraulic pressure in the retard hydraulic chamber 112. That is, when the hydraulic pressure in the advance hydraulic chamber 111 is set to be higher than the hydraulic pressure in the retard hydraulic chamber 112, the rotational phase of the intake camshaft 21 is advanced with respect to the rotational phase of the crankshaft 15 (advance). Conversely, when the hydraulic pressure in the retard hydraulic chamber 112 is set to be higher than the hydraulic pressure in the advance hydraulic chamber 111, the rotational phase of the intake camshaft 21 is retarded with respect to the rotational phase of the crankshaft 15 (retard). Thus, by adjusting the rotational phase of the intake camshaft 21 with respect to the crankshaft 15, the valve timing of the intake valve 13 is varied.

To the intake VVT mechanism 100in, the intake OCV 200in that controls the pressure of the hydraulic oil supplied to the advance hydraulic chamber 111 and the retard hydraulic chamber 112 is connected.

To the intake OCV 200in, the lubricant (hydraulic oil) pumped from the oil pan 18 by the oil pump 19 is supplied via an oil supply passage 131. The intake OCV 200in is connected to the advance hydraulic chamber 111 via an advance passage 121, and is also connected to the retard hydraulic chamber 112 via a retard passage 122. In addition, to the intake OCV 200in, two oil discharge passages 132 and 133 are connected. The intake OCV 200in is an electromagnetically driven flow control valve, and is controlled by the ECU 400 (see FIG. 3).

The intake OCV 200in includes a spool 202 that is disposed in a casing 201 so as to be capable of reciprocating, a compression coil spring 203 that biases the spool 202 to one side, and an electromagnetic solenoid 204 for moving the spool 202 to the other side against the biasing force of the compression coil spring 203.

In the intake OCV 200in, the supply/discharge amount of the hydraulic oil to the advance passage 121 and the retard passage 122 is changed with the movement of the spool 202, whereby it is possible to adjust the hydraulic pressure in each of the advance hydraulic chamber 111 and the retard hydraulic chamber 112.

Next, the ECU 400 that controls the engine 1 will be described.

Figure 3:
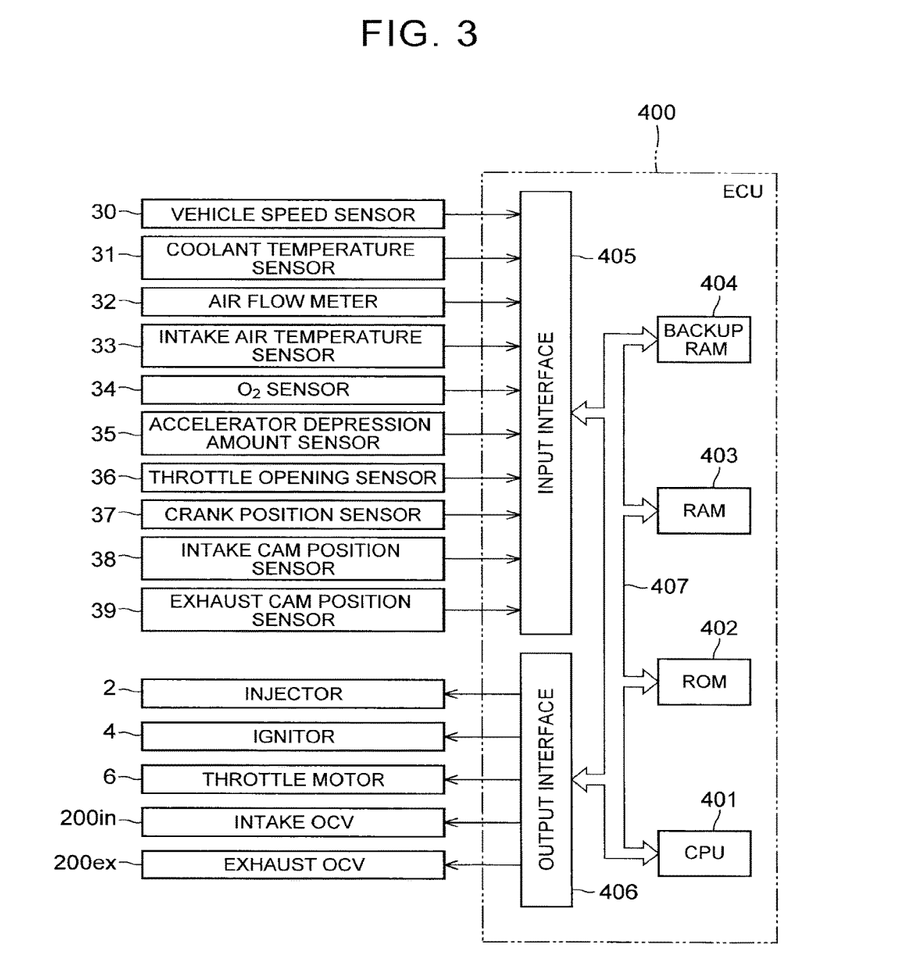
FIG. 3 is a block diagram showing a configuration of the ECU in FIG. 1.

As shown in FIG. 3, the ECU 400 includes a central processing unit (CPU) 401, a read only memory (ROM) 402, a random access memory (RAM) 403, a backup RAM 404, an input interface 405, an output interface 406, and a bus 407 that connects these elements together. In the ECU 400, the CPU 401 executes a program stored in the ROM 402, and each control is thereby implemented.

The CPU 401 executes arithmetic processing based on various control programs and maps stored in the ROM 402. In the ROM 402, various control programs and maps that are consulted when the various control programs are executed are stored. The RAM 403 is a memory that temporarily stores operation results by the CPU 401 and detection results of various sensors. The backup RAM 404 is a nonvolatile memory that stores data to be retained when the ignition is turned OFF.

To the input interface 405, the coolant temperature sensor 31, the air flow meter 32, the intake air temperature sensor 33, the $O_2$ sensor 34, an accelerator depression amount sensor 35 that detects an accelerator depression amount, the throttle opening sensor 36, the crank position sensor 37, the intake cam position sensor 38, the exhaust cam position sensor 39, and a vehicle speed sensor 30 that detects a vehicle speed are connected.

To the output interface 406, the injector 2, the igniter 4, the throttle motor 6, the intake OCV 200in, and the exhaust OCV 200ex are connected.

The ECU 400 executes various control operations of the engine 1 that include drive control (throttle opening control) of the throttle motor 6, fuel injection control of the injector 2, and ignition timing control of the ignition plug 3 based on output signals of various sensors.

The ECU 400 controls the intake VVT mechanism 100in and the exhaust VVT mechanism 100ex in accordance with the operation state of the engine 1. Specifically, the ECU 400 sets a target phase angle of each of the intake valve 13 and the exhaust valve 14 based on the operation state of the engine 1, and controls the intake OCV 200in and the exhaust OCV 200ex such that a deviation between the target phase angle and an actual phase angle (real phase angle) is eliminated.

In the engine 1, the valve timing of the exhaust valve 14 is set to the most advanced position, and the valve timing of the intake valve 13 is set to the most retarded position, when the engine 1 is in an initial state (before the operation is started). Accordingly, in the initial state, an overlap period has the minimum negative value, i.e., a minus overlap period is maximized. Note that the minus overlap denotes that a period in which both of the intake valve and the exhaust valve are brought into a closed state is present in a period from closing of the exhaust valve to opening of the intake valve.

Note that the target phase angle of the exhaust valve 14 is a target retard amount from the initial position (most advanced position) of the exhaust valve 14, and the target phase angle of the intake valve 13 is a target advance amount from the initial position (most retarded position) of the intake valve 13.

Next, with reference to FIG. 4, target phase angle setting control of the valve timing that is executed by the ECU 400 will be described. Note that the following flow is repeatedly executed at predetermined time intervals by the ECU 400.

Figure 4:
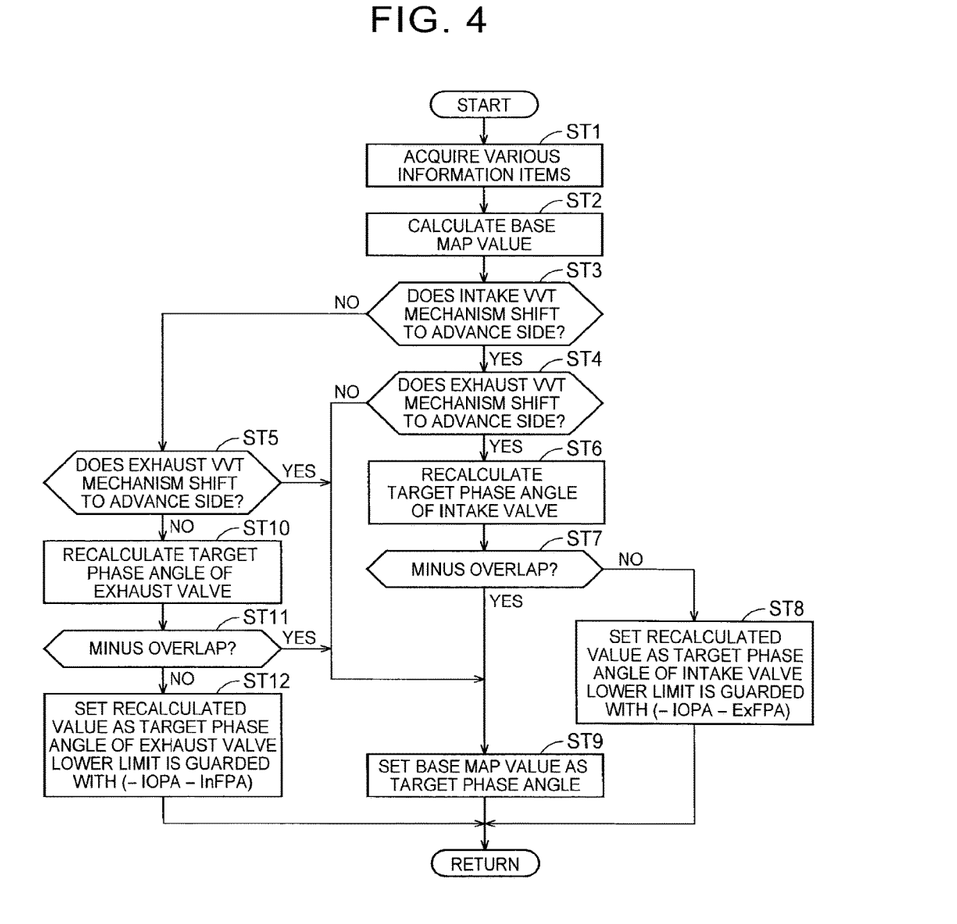
FIG. 4 is a flowchart for explaining target phase angle setting control of a valve timing in the first embodiment.

First, in step ST1 in FIG. 4, various information items are acquired. In the acquisition of the various information items, for example, the intake air amount is acquired from the air flow meter 32, and the rotational speed (the number of revolutions per unit time) of the engine 1 is calculated based on the detection result of the crank position sensor 37. In addition, an actual phase angle (an example of a first actual phase angle) InFPA of the intake valve 13 is calculated based on the detection results of the crank position sensor 37 and the intake cam position sensor 38, and an actual phase angle (an example of a second actual phase angle) ExFPA of the exhaust valve 14 is calculated based on the detection results of the crank position sensor 37 and the exhaust cam position sensor 39.

Next, in step ST2, the target phase angle (an example of a first target phase angle) of the intake valve 13, the target phase angle (an example of a second target phase angle) of the exhaust valve 14, and a target overlap period are calculated from base maps in accordance with the operation state of the engine 1. Specifically, a target phase angle (base map value) InTPA of the intake valve 13 is calculated from a first base map in which the rotational speed and the load factor of the engine 1 are used as parameters, and a target overlap period TOPA is calculated from a second base map in which the rotational speed and the load factor of the engine 1 are used as parameters. Subsequently, from the following Expression (1), a target phase angle (base map value) ExTPA of the exhaust valve 14 is calculated. That is, the base map value ExTPA of the exhaust valve 14 is a calculated value that is calculated by using the base map value InTPA of the intake valve 13 and the target overlap period TOPA.

$$ExTPA = TOPA - (InTPA + IOPA) \quad (1)$$

In Expression (1), IOPA is the overlap period (angle range) in the initial state, and has a negative value. In addition, the overlap period IOPA in the initial state and the first and second base maps are stored in, e.g., the ROM 402. The load factor is a ratio of the intake air amount in the current operation state to the maximum intake air amount to the engine 1, and is calculated based on, e.g., the intake air amount and the rotational speed of the engine 1.

The individual target values calculated in step ST2 (the base map value InTPA of the intake valve 13, the base map value ExTPA of the exhaust valve 14, and the target overlap period TOPA) are values serving as optimum fuel efficiency points corresponding to the operation state.

Next, in step ST3, it is determined whether or not the intake VVT mechanism 100in shifts to an advance side. Note that the determination of whether or not the intake VVT mechanism 100in shifts to the advance side is performed based on the target phase angle and the actual phase angle of the intake valve 13. That is, the actual phase angle InFPA of the intake valve 13 calculated in step ST1 is compared with the target phase angle InTPA of the intake valve 13 calculated in step ST2 and, in the case where the target phase angle InTPA is larger than the actual phase angle InFPA, it is determined that the intake VVT mechanism 100in shifts to the advance side. Subsequently, in the case where the intake VVT mechanism 100in shifts to the advance side, the flow moves to step ST4. On the other hand, in the case where the intake VVT mechanism 100in does not shift to the advance side (shifts to a retard side), the flow moves to step ST5.

Next, in step ST4, it is determined whether or not the exhaust VVT mechanism 100ex shifts to the advance side. Note that the determination of whether or not the exhaust VVT mechanism 100ex shifts to the advance side is performed based on the target phase angle and the actual phase angle of the exhaust valve 14. That is, the actual phase angle ExFPA of the exhaust valve 14 calculated in step ST1 is compared with the target phase angle ExTPA of the exhaust valve 14 calculated in step ST2 and, in the case where the target phase angle ExTPA is smaller than the actual phase angle ExFPA, it is determined that the exhaust VVT mechanism 100ex shifts to the advance side. Subsequently, in the case where the exhaust VVT mechanism 100ex shifts to the advance side, the flow moves to step ST6. On the other hand, in the case where the exhaust VVT mechanism 100ex does not shift to the advance side (shifts to the retard side), the flow moves to step ST9.

In addition, in step ST5, it is determined whether or not the exhaust VVT mechanism 100ex shifts to the advance side. Note that the determination of whether or not the exhaust VVT mechanism 100ex shifts to the advance side is performed by the same method as that in step ST4. Subsequently, in the case where the exhaust VVT mechanism 100ex shifts to the advance side, the flow moves to step ST9. On the other hand, in the case where the exhaust VVT mechanism 100ex does not shift to the advance side (shifts to the retard side), the flow moves to step ST10.

Subsequently, in the case where the valve timings of the intake valve 13 and the exhaust valve 14 are advanced (Yes in step ST3 and step ST4), the target phase angle of the intake valve 13 is recalculated in step ST6. This is because, when the base map value InTPA is used as the target phase angle of the intake valve 13 on a side that increases the overlap, there is a possibility that an actual overlap period FOPA exceeds the target overlap period TOPA due to a following delay of the exhaust valve 14 on a side that decreases the overlap. That is, as will be described later, in order to prevent the actual overlap period FOPA from exceeding the target overlap period TOPA, the target phase angle of the intake valve 13 on the side that increases the overlap is recalculated. The target phase angle of the intake valve 13 is calculated by the following Expression (2).

$$\text{InTPA2} = \text{TOPA} - (\text{ExFPA} + \text{IOPA}) \qquad (2)$$

Figure 5:
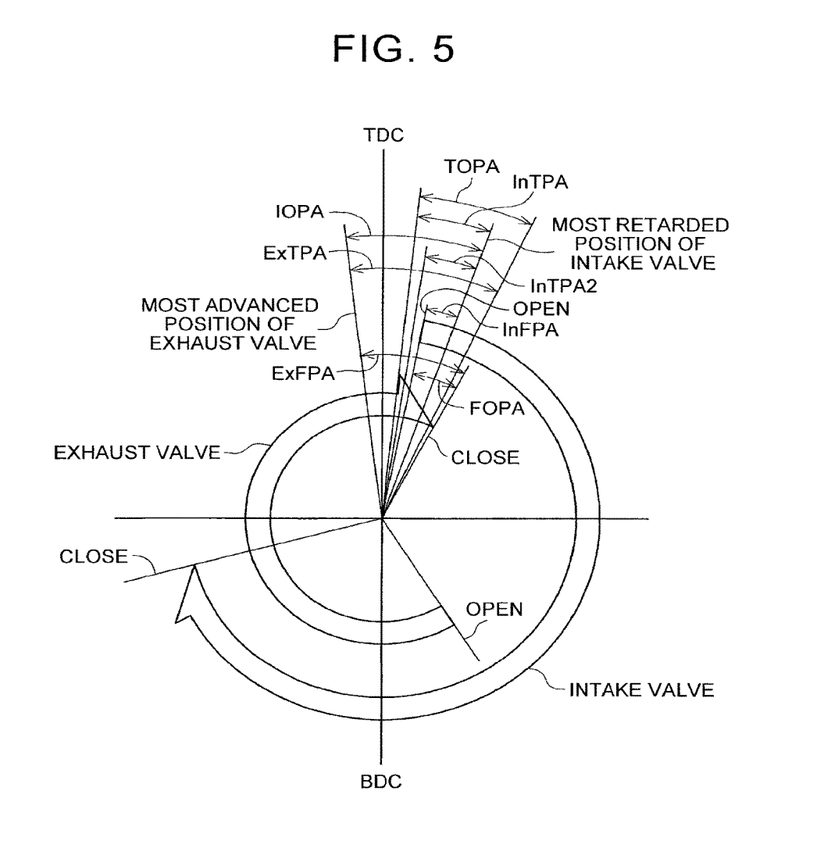
FIG. 5 is a view showing an example of an opening/closing timing at the time of an overlap in the case where valve timings of an intake valve and an exhaust valve are advanced in the first embodiment.

In Expression (2), InTPA2 is the recalculated target phase angle of the intake valve 13. As shown in FIG. 5, the target phase angle InTPA2 (an example of a third target phase angle) is a value that is not more than the base map value InTPA.

In Expression (2), for example, in the case where the actual overlap period FOPA has reached the target overlap period TOPA before the actual phase angle InTPA of the intake valve 13 reaches the target phase angle (base map value) InTPA, the change of the actual phase angle ExFPA of the exhaust valve 14 is awaited, and the target phase angle InTPA2 approaches the base map value InTPA as the actual phase angle ExFPA changes. Subsequently, when the actual phase angle ExFPA of the exhaust valve 14 becomes equal to the target phase angle (base map value) ExTPA, the target phase angle InTPA2 of the intake valve 13 becomes equal to the base map value InTPA. That is, the recalculated target phase angle InTPA2 is the target value of the intake valve 13 that can be permitted within a range in which the actual overlap period FOPA does not exceed the target overlap period TOPA to the actual phase angle ExFPA of the exhaust valve 14.

Thereafter, in step ST7, it is determined whether or not the minus overlap is established. Specifically, it is determined whether or not the following Expression (3) is satisfied and, in the case where Expression (3) is not satisfied, it is determined that each of the valve timing of the intake valve 13 and the valve timing of the exhaust valve 14 is set such that the minus overlap takes place. Subsequently, the minus overlap takes place, the flow moves to step ST9. On the other hand, in the case where the minus overlap is not take place (the overlap takes place), the flow moves to step ST8.

$$\text{InTPA} \geq -\text{IOPA} - \text{ExFPA} \qquad (3)$$

Figure 6:
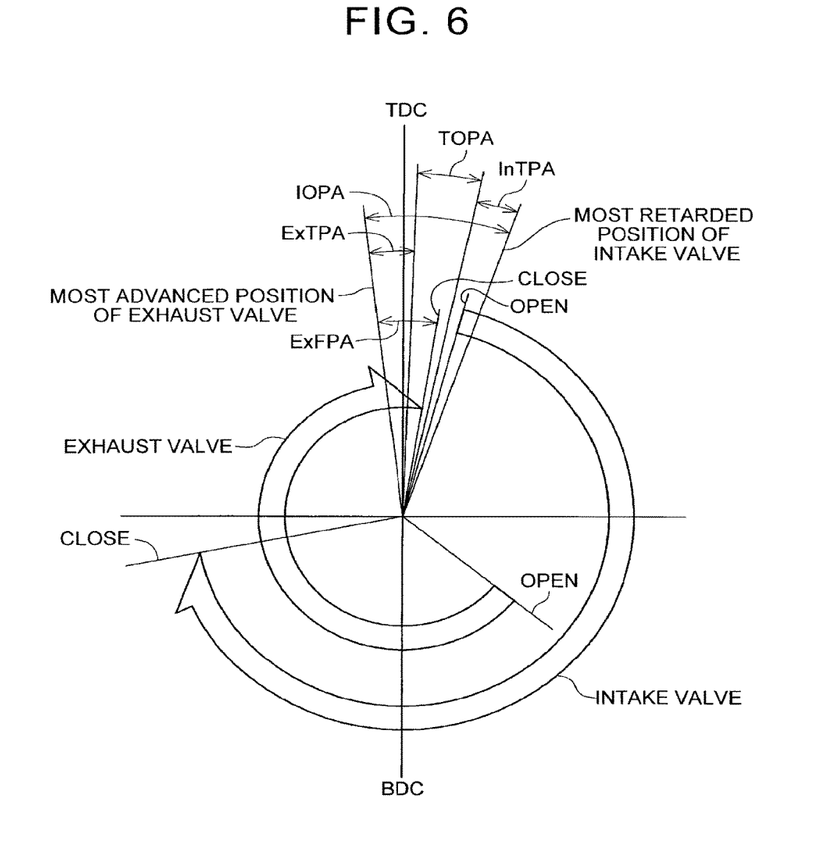
FIG. 6 is a view showing an example of the opening/closing timing at the time of a minus overlap in the case where the valve timings of the intake valve and the exhaust valve are advanced in the first embodiment.

In Expression (3), as shown in FIG. 6, it is determined whether or not the target phase angle InTPA of the intake valve 13 is positioned in an area obtained by subtracting the actual phase angle ExFPA of the exhaust valve 14 from the range of the negative overlap period IOPA in the initial state and, in the case where the target phase angle InTPA is positioned in the area, Expression (3) is not satisfied, and it is determined that the minus overlap takes place.

Subsequently, as shown in FIG. 5, at the time of the overlap (No in step ST7), in step ST8, the target phase angle InTPA2 recalculated in step ST6 is set as the target phase angle of the intake valve 13 on the side that increases the overlap, and the base map value ExTPA calculated in step ST2 is set as the target phase angle of the exhaust valve 14 on the side that decreases the overlap. That is, at the time of the overlap in a situation in which the valve timings of the intake valve 13 and the exhaust valve 14 are advanced, the recalculated target phase angle InTPA2 that is not more than the base map value InTPA is set as the target phase angle of the intake valve 13 such that the actual overlap period FOPA does not exceed the target overlap period TOPA.

Note that, at the time of the overlap, −IOPA−ExFPA is set as a lower limit guard value of the target phase angle of the intake valve 13, and the target phase angle is thereby prevented from having a value that is unnecessarily low. That is, in the case where the recalculated target phase angle InTPA2 of the intake valve 13 is smaller than the lower limit guard value (−IOPA−ExFPA), the lower limit guard value is set as the target phase angle of the intake valve 13. Note that IOPA is the overlap period in the initial state, and ExFPA is the actual phase angle of the exhaust valve 14.

On the other hand, as shown in FIG. 6, when the minus overlap takes place (Yes in step ST7), in step ST9, the base map value InTPA calculated in step ST2 is set as the target phase angle of the intake valve 13, and the base map value ExTPA calculated in step ST2 is set as the target phase angle of the exhaust valve 14. That is, when the minus overlap takes place in the situation in which the valve timings of the intake valve 13 and the exhaust valve 14 are advanced, it is not necessary to limit the target phase angle of the intake valve 13, and hence the base map value InTPA is set as the target phase angle of the intake valve 13.

In the case where the valve timings of the intake valve 13 and the exhaust valve 14 are retarded (No in steps ST3 and ST5), the target phase angle of the exhaust valve 14 is recalculated in step ST10. This is because, when the base map value ExTPA is used as the target phase angle of the exhaust valve 14 on the side that increases the overlap, there are cases where the actual overlap period FOPA exceeds the target overlap period TOPA due to the following delay of the intake valve 13 on the side that decreases the overlap. That is, as will be described later, in order to prevent the actual overlap period FOPA from exceeding the target overlap period TOPA, the target phase angle of the exhaust valve 14 on the side that increases the overlap is recalculated. The target phase angle of the exhaust valve 14 is calculated by the following Expression (4).

$$\text{ExTPA2} = \text{TOPA} - (\text{InFPA} + \text{IOPA}) \qquad (4)$$

In Expression (4), ExTPA2 is the recalculated target phase angle of the exhaust valve 14. The target phase angle ExTPA2 (an example of a fourth target phase angle) is a value that is not more than the base map value ExTPA.

In Expression (4), for example, in the case where the actual overlap period FOPA has reached the target overlap period TOPA before the actual phase angle ExFPA of the exhaust valve 14 reaches the target phase angle (base map value) ExTPA, the change of the actual phase angle InFPA of the intake valve 13 is awaited, and the target phase angle ExTPA2 approaches the base map value ExTPA as the actual phase angle InFPA changes. Subsequently, when the actual phase angle InFPA of the intake valve 13 becomes equal to the target phase angle (base map value) InTPA, the target phase angle ExTPA2 of the exhaust valve 14 becomes equal to the base map value ExTPA. That is, the recalculated target phase angle ExTPA2 is the target value of the exhaust valve 14 that can be permitted within the range in which the actual overlap period FOPA does not exceed the target overlap period TOPA to the actual phase angle InFPA of the intake valve 13.

Thereafter, in step ST11, it is determined whether or not the minus overlap takes place. Specifically, it is determined whether or not the following Expression (5) is satisfied and, in the case where Expression (5) is not satisfied, it is determined that each of the valve timing of the intake valve 13 and the valve timing of the exhaust valve 14 is set such that the minus overlap takes place. Subsequently, in the case where the minus overlap takes place, the flow moves to step ST9. On the other hand, in the case where the minus overlap is not take place (the overlap takes place), the flow moves to step ST12.

$$\text{ExTPA} \geq -\text{IOPA} - \text{InFPA} \quad (5)$$

In Expression (5), it is determined whether or not the target phase angle ExTPA of the exhaust valve 14 is positioned in an area obtained by subtracting the actual phase angle InFPA of the intake valve 13 from the range of the negative overlap period IOPA in the initial state and, in the case where the target phase angle ExTPA is position in the area, Expression (5) is not satisfied, and it is determined that each of the valve timing of the intake valve 13 and the valve timing of the exhaust valve 14 is set such that the minus overlap takes place.

At the time of the overlap (No in step ST11), in step ST12, the target phase angle ExTPA2 recalculated in step ST10 is set as the target phase angle of the exhaust valve 14 on the side that increases the overlap, and the base map value InTPA calculated in step ST2 is set as the target phase angle of the intake valve 13 on the side that decreases the overlap. That is, at the time of the overlap in a situation in which the valve timings of the intake valve 13 and the exhaust valve 14 are retarded, the recalculated target phase angle ExTPA2 that is not more than the base map value ExTPA is set as the target phase angle of the exhaust valve 14 such that the actual overlap period FOPA does not exceed the target overlap period TOPA.

Note that, at the time of the overlap, −IOPA−InFPA is set as the lower limit guard value of the target phase angle of the exhaust valve 14, and the target phase angle is thereby prevented from having a value that is unnecessarily low. That is, in the case where the recalculated target phase angle ExTPA2 of the exhaust valve 14 is smaller than the lower limit guard value (−IOPA−InFPA), the lower limit guard value is set as the target phase angle of the exhaust valve 14. Note that IOPA is the overlap period in the initial state, and InFPA is the actual phase angle of the intake valve 13.

On the other hand, when the minus overlap takes place (Yes in step ST11), in step ST9, the base map value InTPA calculated in step ST2 is set as the target phase angle of the intake valve 13, and the base map value ExTPA calculated in step ST2 is set as the target phase angle of the exhaust valve 14. That is, when the minus overlap takes place in the situation in which the valve timings of the intake valve 13 and the exhaust valve 14 are retarded, it is not necessary to limit the target phase angle of the exhaust valve 14, and hence the base map value ExTPA is set as the target phase angle of the exhaust valve 14.

In the case where the valve timing of the intake valve 13 is advanced and the valve timing of the exhaust valve 14 is retarded (Yes in step ST3, No in step ST4), the valve timings of the intake valve 13 and the exhaust valve 14 shift to the side that increases the overlap period, and hence the actual overlap period FOPA does not exceed the target overlap period TOPA. Accordingly, in step ST9, the base map value InTPA calculated in step ST2 is set as the target phase angle of the intake valve 13, and the base map value ExTPA calculated in step ST2 is set as the target phase angle of the exhaust valve 14.

In the case where the valve timing of the intake valve 13 is retarded and the valve timing of the exhaust valve 14 is advanced (No in step ST3, Yes in step ST5), the valve timings of the intake valve 13 and the exhaust valve 14 shift to the side that decreases the overlap period, and hence, in step ST9, the base map value InTPA calculated in step ST2 is set as the target phase angle of the intake valve 13, and the base map value ExTPA calculated in step ST2 is set as the target phase angle of the exhaust valve 14.

In the first embodiment, as described above, the target phase angle (base map value) InTPA is calculated from the base map in accordance with the operation state (e.g., the rotational speed and the load factor of the engine 1) and, in the case where the valve timings of the intake valve 13 and the exhaust valve 14 are advanced, the target phase angle InTPA2 that is not more than the base map value InTPA is calculated (recalculated) as the target phase angle of the intake valve 13 that shifts to the side that increases the overlap period.

With this configuration, at the time of the overlap in the case where the valve timings of the intake valve 13 and the exhaust valve 14 are advanced, by setting the recalculated target phase angle InTPA2 as the target phase angle of the intake valve 13, it is possible prevent the actual overlap period FOPA from exceeding the target overlap period TOPA. In addition, when the minus overlap takes place in the case where the valve timings of the intake valve 13 and the exhaust valve 14 are advanced, by setting the base map value InTPA as the target phase angle of the intake valve 13, it is possible to facilitate convergence of the valve timing of the intake valve 13 to the base map value InTPA. That is, when the minus overlap takes place, unlike when the overlap takes place, it is not necessary to limit the target phase angle of the intake valve 13, and hence the base map value InTPA is set as the target phase angle. Consequently, in the case where the valve timings of the intake valve 13 and the exhaust valve 14 are advanced, it is possible to facilitate the convergence of the valve timing of the intake valve 13 to the base map value InTPA while preventing the actual overlap period FOPA from exceeding the target overlap period TOPA. As a result, it is possible to achieve an improvement in fuel efficiency.

In addition, in the first embodiment, the target phase angle (base map value) Ex TPA of the exhaust valve 14 is calculated from the base map in accordance with the operation state (e.g., the rotational speed and the load factor of the engine 1) and, in the case where the valve timings of the intake valve 13 and the exhaust valve 14 are retarded, the target phase angle ExTPA2 that is not more than the base map value ExTPA is calculated (recalculated) as the target phase angle of the exhaust valve 14 that shifts to the side that increases the overlap period.

With this configuration, at the time of the overlap in the case where the valve timings of the intake valve 13 and the exhaust valve 14 are retarded, by setting the recalculated target phase angle ExTPA2 as the target phase angle of the exhaust valve 14, it is possible to prevent the actual overlap period FOPA from exceeding the target overlap period TOPA. In addition, when the minus overlap takes place in the case where the valve timings of the intake valve 13 and the exhaust valve 14 are retarded, by setting the base map value ExTPA as the target phase angle of the exhaust valve 14, it is possible to facilitate the convergence of the valve timing of the exhaust valve 14 to the base map value ExTPA. That is, when the minus overlap takes place, unlike the overlap takes place, it is not necessary to limit the target phase angle of the exhaust valve 14, and hence the base map value ExTPA is set as the target phase angle. Consequently, in the case where the valve timings of the intake valve 13 and the exhaust valve 14 are retarded, it is possible to facilitate the convergence of the valve timing of the exhaust valve 14 to the base map value ExTPA while preventing the actual overlap period FOPA from exceeding the target overlap period TOPA. As a result, it is possible to achieve a reduction in exhaust emission.

Further, in the first embodiment, by determining whether or not Expression (3) described above is satisfied, it is possible to easily determine whether or not the minus overlap takes place. Similarly, by determining whether or not Expression (5) described above is satisfied, it is possible to easily determine whether or not the minus overlap takes place.

Next, the target phase angle setting control of the valve timing according to a second embodiment of the invention will be described. Note that the engine 1 and the ECU 400 that controls the engine 1 are configured substantially similarly to those in the first embodiment, and hence the description of overlapping portions will be omitted.

When the intake camshaft 21 opens or closes the intake valve 13, a cam reaction force (a force received from a valve spring) periodically increases or decreases with an opening/closing operation of the intake valve 13, and the cam reaction force that increases or decreases acts on the intake VVT mechanism 100in. Similarly, when the exhaust camshaft 22 opens or closes the exhaust valve 14, the cam reaction force periodically increases or decreases with the opening/closing operation of the exhaust valve 14, and the cam reaction force that increases or decreases acts on the exhaust VVT mechanism 100ex.

When the cam reaction force that increases or decreases acts on the intake VVT mechanism 100in, there are cases where the intake valve 13 fluctuates within a predetermined angle range (a variation of the actual phase angle with respect to the target phase angle occurs). In addition, when the cam reaction force that increases or decreases acts on the exhaust VVT mechanism 100ex, there are cases where the exhaust valve 14 fluctuates within a predetermined angle range. Thus, in the case where the variation of the actual phase angle with respect to the target phase angle has occurred in each of the valve timings of the intake valve 13 and the exhaust valve 14, there is a possibility that the actual overlap period exceeds the target overlap period and an internal EGR amount becomes excessive.

To cope with this, in the second embodiment, by setting the target phase angle in consideration of a valve variation angle resulting from the cam reaction force, even when the intake valve 13 and the exhaust valve 14 fluctuate due to the cam reaction force, the actual overlap period is prevented from exceeding the target overlap period.

Figure 7:
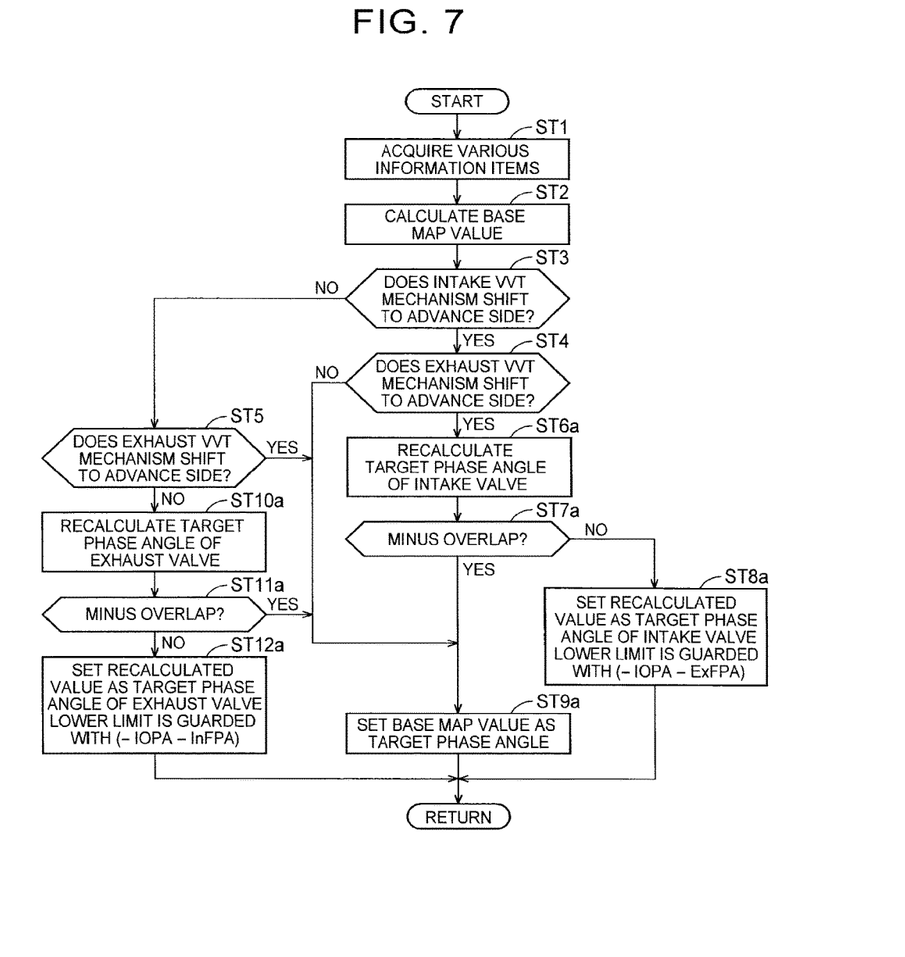
FIG. 7 is a flowchart for explaining the target phase angle setting control of the valve timing in a second embodiment.

Next, with reference to FIG. 7, the target phase angle setting control of the valve timing according to the second embodiment will be described. Note that the flow in FIG. 7 is repeatedly executed at predetermined time intervals by the ECU 400. In addition, steps ST1 to ST5 are the same as those in the first embodiment, and hence the description thereof will be omitted.

In the case where the valve timings of the intake valve 13 and the exhaust valve 14 are advanced (Yes in steps ST3 and ST4), in step ST6a, the target phase angle of the intake valve 13 is recalculated. In the second embodiment, the target phase angle of the intake valve 13 obtained in consideration of the valve variation angle resulting from the cam reaction force is calculated. The target phase angle of the intake valve 13 is calculated by the following Expression (6).

$$InTPA3 = TOPA - (ExFPA + (IOPA + OSPA)) \quad (6)$$

In Expression (6), InTPA3 is the recalculated target phase angle of the intake valve 13. The target phase angle InTPA3 (an example of a fifth target phase angle) is a value that is not more than the base map value InTPA. TOPA is the target overlap period calculated in step ST2, and IOPA is the overlap period in the initial state. ExFPA is the actual phase angle of the exhaust valve 14 calculated in step ST1.

OSPA is the valve variation angle, and is a value obtained by adding the variation angle (fluctuating angle range) of the intake valve 13 resulting from the cam reaction force and the variation angle of the exhaust valve 14 resulting from the cam reaction force together. Note that, in the valve variation angle OSPA, a predetermined margin may be added to the total value of the variation angle of the intake valve 13 and the variation angle of the exhaust valve 14. The valve variation angle OSPA is a value preset in correspondence to, e.g., specifications of the engine 1, and is stored in the ROM 402.

The target phase angle InTPA3 calculated by Expression (6) is smaller than the target phase angle InTPA2 of the first embodiment calculated by Expression (2) described above by an angle corresponding to the valve variation angle OSPA. That is, the recalculated target phase angle InTPA3 is a value set such that the actual overlap period FOPA does not exceed the target overlap period TOPA even when the variations (fluctuations) have occurred in the intake valve 13 and the exhaust valve 14 due to the cam reaction force.

Subsequently, in step ST7a, it is determined whether or not the minus overlap takes place. Specifically, it is determined whether or not the following Expression (7) is satisfied and, in the case where Expression (7) is not satisfied, it is determined that each of the valve timing of the intake valve 13 and the valve timing of the exhaust valve 14 is set such that the minus overlap takes place. Subsequently, when the minus overlap takes place, the flow moves to step ST9a. On the other hand, when the minus overlap is not take place (the overlap takes place), the flow moves to step ST8a.

$$InTPA \geq -(TOPA + OSPA) - ExFPA \quad (7)$$

In Expression (7), InTPA is the target phase angle (base map value) of the intake valve 13 calculated in step ST2. In step ST7a, in the case where there is a possibility that the overlap is established due to the variations (fluctuations) of the intake valve 13 and the exhaust valve 14 resulting from the cam reaction force, it is determined that the overlap is established.

At the time of the overlap (No in step ST7a), in step ST8a, the target phase angle InTPA3 recalculated in step ST6a is set as the target phase angle of the intake valve 13 on the side that increase the overlap, and the base map value ExTPA calculated in step ST2 is set as the target phase angle of the exhaust valve 14 on the side that decreases the overlap.

Note that, at the time of the overlap, −IOPA−ExFPA is set as the lower limit guard value of the target phase angle of the intake valve 13, and the target phase angle is thereby prevented from having a value that is unnecessarily low. That is, in the case where the recalculated target phase angle InTPA3 of the intake valve 13 is smaller than the lower limit guard value (−IOPA−ExFPA), the lower limit guard value is set as the target phase angle of the intake valve 13.

On the other hand, at the time of the minus overlap takes place (Yes in step ST7a), in step ST9a, the base map value InTPA calculated in step ST2 is set as the target phase angle of the intake valve 13, and the base map value ExTPA calculated in step ST2 is set as the target phase angle of the exhaust valve 14.

In the case where the valve timings of the intake valve 13 and the exhaust valve 14 are retarded (No in steps ST3 and ST5), in step ST10a, the target phase angle of the exhaust valve 14 is recalculated. In the second embodiment, the target phase angle of the exhaust valve 14 obtained in consideration of the valve variation angle resulting from the cam reaction force is calculated. The target phase angle of the exhaust valve 14 is calculated by the following Expression (8).

$$ExTPA3=TOPA-(InFPA+(IOPA+OSPA)) \quad (8)$$

In Expression (8), ExTPA3 is the recalculated target phase angle of the exhaust valve 14. The target phase angle ExTPA3 (an example of a sixth target phase angle) is a value that is not more than the base map value ExTPA. InFPA is the actual phase angle of the intake valve 13 calculated in step ST1.

The target phase angle ExTPA3 calculated by Expression (8) is smaller than the target phase angle ExTPA2 of the first embodiment calculated by Expression (4) described above by an angle corresponding to the valve variation angle OSPA. That is, the recalculated target phase angle ExTPA3 is a value set such that the actual overlap period FOPA does not exceed the target overlap period TOPA even when the variations (fluctuations) have occurred in the intake valve 13 and the exhaust valve 14 due to the cam reaction force.

Thereafter, in step ST11*a*, it is determined whether or not the minus overlap is established. Specifically, it is determined whether or not the following Expression (9) is satisfied and, in the case where Expression (9) is not satisfied, it is determined that each of the valve timing of the intake valve 13 and the valve timing of the exhaust valve 14 is set such that the minus overlap takes place. Subsequently, in the case where the minus overlap takes place, the flow moves to step ST9*a*. On the other hand, in the case where the minus overlap is not take place (the overlap takes place), the flow moves to step ST12*a*.

$$ExTPA-(TOPA+OSPA)-InFPA \quad (9)$$

In Expression (9), ExTPA is the target phase angle (base map value) of the exhaust valve 14 calculated in step ST2. In step ST11*a*, in the case where there is a possibility that the overlap is established due to the variations (fluctuations) of the intake valve 13 and the exhaust valve 14 resulting from the cam reaction force, it is determined that the overlap is established.

Subsequently, at the time of the overlap (No in step ST11*a*), in step ST12*a*, the target phase angle ExTPA3 recalculated in step ST10*a* is set as the target phase angle of the exhaust valve 14 on the side that increases the overlap, and the base map value InTPA calculated in step ST2 is set as the target phase angle of the intake valve 13 on the side that decreases the overlap.

At the time of the overlap, −IOPA−InFPA is set as the lower limit guard value of the target phase angle of the exhaust valve 14, and the target phase angle is thereby prevented from having a value that is unnecessarily low. That is, in the case where the recalculated target phase angle ExTPA3 of the exhaust valve 14 is smaller than the lower limit guard value (−IOPA−InFPA), the lower limit guard value is set as the target phase angle of the exhaust valve 14.

On the other hand, when the minus overlap takes place (Yes in step ST11*a*), in step ST9*a*, the base map value InTPA calculated in step ST2 is set as the target phase angle of the intake valve 13, and the base map value ExTPA calculated in step ST2 is set as the target phase angle of the exhaust valve 14.

In the case where the valve timing of the intake valve 13 is advanced and the valve timing of the exhaust valve 14 is retarded (Yes in step ST3, No in step ST4), the valve timings of the intake valve 13 and the exhaust valve 14 shift to the side that increases the overlap period, and hence the actual overlap period FOPA does not exceed the target overlap period TOPA. Accordingly, in step ST9*a*, the base map value InTPA calculated in step ST2 is set as the target phase angle of the intake valve 13, and the base map value ExTPA calculated in step ST2 is set as the target phase angle of the exhaust valve 14.

In the case where the valve timing of the intake valve 13 is retarded and the valve timing of the exhaust valve 14 is advanced (No in step ST3, Yes in step ST5), the valve timings of the intake valve 13 and the exhaust valve 14 shift to the side that decreases the overlap period, and hence, in step ST9*a*, the base map value InTPA calculated in step ST2 is set as the target phase angle of the intake valve 13, and the base map value ExTPA calculated in step ST2 is set as the target phase angle of the exhaust valve 14.

As described above, in the second embodiment, in the case where the valve timings of the intake valve 13 and the exhaust valve 14 are advanced, the target phase angle InTPA3 of the intake valve 13 that shifts to the side that increases the overlap period is calculated (recalculated) by using the valve variation angle OSPA in addition to the target overlap period TOPA and the actual phase angle ExFPA of the exhaust valve 14. In addition, at the time of the overlap in the case where the valve timings of the intake valve 13 and the exhaust valve 14 are advanced, the recalculated target phase angle InTPA3 is set as the target phase angle of the intake valve 13.

With this configuration, by setting the target phase angle InTPA3 that is smaller than that in the first embodiment by the angle corresponding to the valve variation angle OSPA for the intake valve 13 on the side that increases the overlap, even when the intake valve 13 and the exhaust valve 14 fluctuate due to the earn reaction force, it is possible to prevent the actual overlap period FOPA from exceeding the target overlap period TOPA. Consequently, it is possible to prevent the internal EGR amount from becoming excessive.

In addition, in the second embodiment, in the case where the valve timings of the intake valve 13 and the exhaust valve 14 are retarded, the target phase angle ExTPA3 of the exhaust valve 14 that shifts to the side that increases the overlap period is calculated (recalculated) by using the valve variation angle OSPA in addition to the target overlap period TOPA and the actual phase angle InFPA of the intake valve 13. At the time of the overlap in the case where the valve timings of the intake valve 13 and the exhaust valve 14 are retarded, the recalculated target phase angle ExTPA3 is set as the target phase angle of the exhaust valve 14.

With this configuration, by setting the target phase angle ExTPA3 that is smaller than that in the first embodiment by the angle corresponding to the valve variation angle OSPA for the exhaust valve 14 on the side that increases the overlap, even when the intake valve 13 and the exhaust valve 14 fluctuate due to the cam reaction force, it is possible to prevent the actual overlap period FOPA from exceeding the target overlap period TOPA. Consequently, it is possible to prevent the internal EGR amount from becoming excessive.

In addition, in the second embodiment, by determining whether or not the minus overlap takes place in consideration of the valve variation angle OSPA, it is possible to determine that the overlap takes place in the case where there is a possibility that the overlap takes place due to the variations (fluctuations) of the intake valve 13 and the exhaust valve 14 resulting from the cam reaction force.

Note that the other effects of the second embodiment are the same as those of the first embodiment.

It should be noted that the embodiments disclosed herein are illustrative in every respect, and do not form a basis of any limitative interpretation. Accordingly, the technical scope of the invention shall not be interpreted using the embodiments only, but shall be defined based on the claims. Further, the technical scope of the invention includes any modifications within the meaning and the scope equivalent to the claims.

For example, the first embodiment has described the example in which the base map value InTPA is set as the target phase angle of the intake valve 13 when the minus overlap takes place in the case where the valve timings of the intake valve 13 and the exhaust valve 14 are advanced, and the base map value ExTPA is set as the target phase angle of the exhaust valve 14 when the minus overlap takes place in the case where the valve timings of the intake valve 13 and the exhaust valve 14 are retarded, but the invention is not limited thereto. When the base map value InTPA is set as the target phase angle of the intake valve 13 when the minus overlap takes place in the case where the valve timings of the intake valve 13 and the exhaust valve 14 are advanced, the recalculated target phase angle ExTPA2 may be set as the target phase angle of the exhaust valve 14 when the minus overlap takes place in the case where the valve timings of the intake valve 13 and the exhaust valve 14 are retarded. Similarly, when the base map value ExTPA is set as the target phase angle of the exhaust valve 14 when the minus overlap takes place in the case where the valve timings of the intake valve 13 and the exhaust valve 14 are retarded, the recalculated target phase angle InTPA2 may be set as the target phase angle of the intake valve 13 when the minus overlap takes place in the case where the valve timings of the intake valve 13 and the exhaust valve 14 are advanced.

In addition, the first embodiment has described the example in which the intake VVT mechanism 100in is controlled by the intake OCV 200in, but the invention is not limited thereto, and the intake VVT mechanism may also be an electric intake VVT mechanism. Note that the same applies to the exhaust VVT mechanism 100ex.

Further, the first embodiment has described the example in which working angles of the intake valve 13 and the exhaust valve 14 are constant, but the invention is not limited thereto, and the working angles of the intake valve and the exhaust valve may also be variable.

Furthermore, the first embodiment has described the example in which the base map value is calculated based on the rotational speed and the load factor of the engine 1, but the invention is not limited thereto, and the base map value may also be calculated in consideration of other parameters in addition to the rotational speed and the load factor of the engine.

Moreover, the first embodiment has described the example in which it is determined whether or not the minus overlap takes place after the target phase angle of the intake valve 13 is recalculated, but the invention is not limited thereto. It may be determined whether or not the minus overlap takes place and, in the case where the minus overlap is not take place, the target phase angle of the intake valve may also be recalculated. That is, the flowchart in FIG. 4 is only exemplary and the invention is not limited by its procedures.

In addition, the first embodiment has described the example in which the engine 1 is the four-cylinder gasoline engine, but the invention is not limited thereto, and the engine may be a diesel engine and the number of cylinders and the type (a V type or a horizontally opposed type) of the engine may be any number and any type.

Further, the first embodiment has described the example in which the oil pump 19 is the mechanical oil pump, but the invention is not limited thereto, and the oil pump may also be an electric oil pump.

Furthermore, the first embodiment has described the example in which the base map value ExTPA of the exhaust valve 14 is calculated based on the base map value InTPA of the intake valve 13 and the target overlap period TOPA, but the invention is not limited thereto, and the base map value of the exhaust valve may also be derived from a map. Alternatively, the target phase angle of the exhaust valve and the target overlap period may also be derived from the map, and the target phase angle of the intake valve may also be calculated by using the result.

Note that a modification of the first embodiment described above may be applied to the second embodiment.

The second embodiment has described the example in which the valve variation angle OSPA is the preset value, but the invention is not limited thereto, and the valve variation angle may also be a calculated value calculated in accordance with the operation state of the engine.

What is claimed is:

1. A control device for an internal combustion engine,
the internal combustion engine including an intake valve, an exhaust valve, an intake variable valve timing mechanism, and an exhaust variable valve timing mechanism,
the intake variable valve timing mechanism being configured to change a first valve timing, the first valve timing being a valve timing of the intake valve,
the exhaust variable valve timing mechanism being configured to change a second valve timing, the second valve timing being a valve timing of the exhaust valve,
the control device comprising
an electronic control unit configured to:
calculate a first target phase angle of the intake valve, a second target phase angle of the exhaust valve, and a target overlap period, based on a rotational speed and a load factor of the internal combustion engine;
calculate a third target phase angle of the intake valve, when the first valve timing and the second valve timing are advanced, based on the target overlap period and an actual phase angle of the exhaust valve;
set the second target phase angle as a set phase angle of the exhaust valve and set the third target phase angle as a set phase angle of the intake valve, when the first valve timing and the second valve timing are advanced; and
set the second target phase angle as the set phase angle of the exhaust valve and set the first target phase angle as the set phase angle of the intake valve, when the first valve timing and the second valve timing are advanced such that a minus overlap takes place,
the minus overlap being a state such that both of the intake valve and the exhaust valve are in a closed state in a period from closing of the exhaust valve to opening of the intake valve.

2. The control device according to claim 1, wherein the electronic control unit is configured to determine whether or not the first valve timing and the second valve timing are set such that the minus overlap takes place based on the first target phase angle and the actual phase angle of the exhaust valve in a case where the first valve timing and the second valve timing are advanced.

3. The control device according to claim 1, wherein
the electronic control unit is configured to calculate a fourth target phase angle of the exhaust valve based on the target overlap period and an actual phase angle of the intake valve, when the first valve timing and the second valve timing are retarded,
the electronic control unit is configured to set the fourth target phase angle as the set phase angle of the exhaust valve and set the first target phase angle as the set phase angle of the intake valve, when the first valve timing and the second valve timing are retarded, and
the electronic control unit is configured to set the second target phase angle as the set phase angle of the exhaust valve and set the first target phase angle as the set phase angle of the intake valve, when the first valve timing and the second valve timing are retarded such that the minus overlap takes place.

4. The control device according to claim 3, wherein
the electronic control unit is configured to determine whether or not the minus overlap takes place based on the second target phase angle and the actual phase angle of the intake valve when the first valve timing and the second valve timing are retarded.

5. The control device according to claim 1, wherein
the electronic control unit is configured to calculate a fifth target phase angle of the intake valve based on the target overlap period, the actual phase angle of the exhaust valve, and a valve variation angle when the first valve timing and the second valve timing are advanced.

6. The control device according to claim 5, wherein
the electronic control unit is configured to determine whether or not the minus overlap takes place based on the first target phase angle, the actual phase angle of the exhaust valve, and the valve variation angle when the first valve timing and the second valve timing are advanced.

7. The control device according to claim 5, wherein
the electronic control unit is configured to calculate a sixth target phase angle of the exhaust valve based on the target overlap period, an actual phase angle of the intake valve, and the valve variation angle when the first valve timing and the second valve timing are retarded,
the electronic control unit is configured to set the sixth target phase angle as the set phase angle of the exhaust valve and set the first target phase angle as the set phase angle of the intake valve when the first valve timing and the second valve timing are retarded, and
the electronic control unit is configured to set the first target phase angle as the set phase angle of the intake valve and set the second target phase angle as the set phase angle of the exhaust valve when the first valve timing and the second valve timing are retarded such that the minus overlap takes place.

8. The control device according to claim 7, wherein
the electronic control unit is configured to determine whether or not the minus overlap takes place based on the second target phase angle, the actual phase angle of the intake valve, and the valve variation angle when the first valve timing and the second valve timing are retarded.

9. A control device for an internal combustion engine,
the internal combustion engine including an intake valve, an exhaust valve, an intake variable valve timing mechanism, and an exhaust variable valve timing mechanism,
the intake variable valve timing mechanism being configured to change a first valve timing, the first valve timing being a valve timing of the intake valve,
the exhaust variable valve timing mechanism being configured to change a second valve timing, the second valve timing being a valve timing of the exhaust valve,
the control device comprising
an electronic control unit configured to:
calculate a first target phase angle of the intake valve, a second target phase angle of the exhaust valve, and a target overlap period based on a rotational speed and a load factor of the internal combustion engine;
calculate a third target phase angle of the exhaust valve based on the target overlap period and an actual phase angle of the intake valve when the first valve timing and the second valve timing are retarded;
set the third target phase angle as a set phase angle of the exhaust valve and set the first target phase angle as a set phase angle of the intake valve when the first valve timing and the second valve timing are retarded; and
set the second target phase angle as the set phase angle of the exhaust valve and set the first target phase angle as the set phase angle of the intake valve, when the first valve timing and the second valve timing are retarded such that a minus overlap takes place,
the minus overlap being a state such that both of the intake valve and the exhaust valve are in a closed state in a period from closing of the exhaust valve to opening of the intake valve.

10. A control method for an internal combustion engine,
the internal combustion engine including an intake valve, an exhaust valve, an intake variable valve timing mechanism, an exhaust variable valve timing mechanism and an electronic control unit,
the intake variable valve timing mechanism being configured to change a first valve timing, the first valve timing being a valve timing of the intake valve,
the exhaust variable valve timing mechanism being configured to change a second valve timing, the second valve timing being a valve timing of the exhaust valve,
the control method comprising:
calculating, by the electronic control unit, a first target phase angle of the intake valve, a second target phase angle of the exhaust valve, and a target overlap period, based on a rotational speed and a load factor of the internal combustion engine;
calculating, by the electronic control unit, a third target phase angle of the intake valve, when the first valve timing and the second valve timing are advanced, based on the target overlap period and an actual phase angle of the exhaust valve;
setting, by the electronic control unit, the second target phase angle as a set phase angle of the exhaust valve and setting the third target phase angle as a set phase angle of the intake valve, when the first valve timing and the second valve timing are advanced; and
setting, by the electronic control unit, the second target phase angle as the set phase angle of the exhaust valve and setting the first target phase angle as the set phase angle of the intake valve, when the first valve timing and the second valve timing are advanced such that a minus overlap takes place,
the minus overlap being a state such that both of the intake valve and the exhaust valve are in a closed state in a period from closing of the exhaust valve to opening of the intake valve.

* * * * *